June 10, 1924.
D. LONEY
VEHICLE BUMPER
Filed Oct. 4, 1923
1,496,814
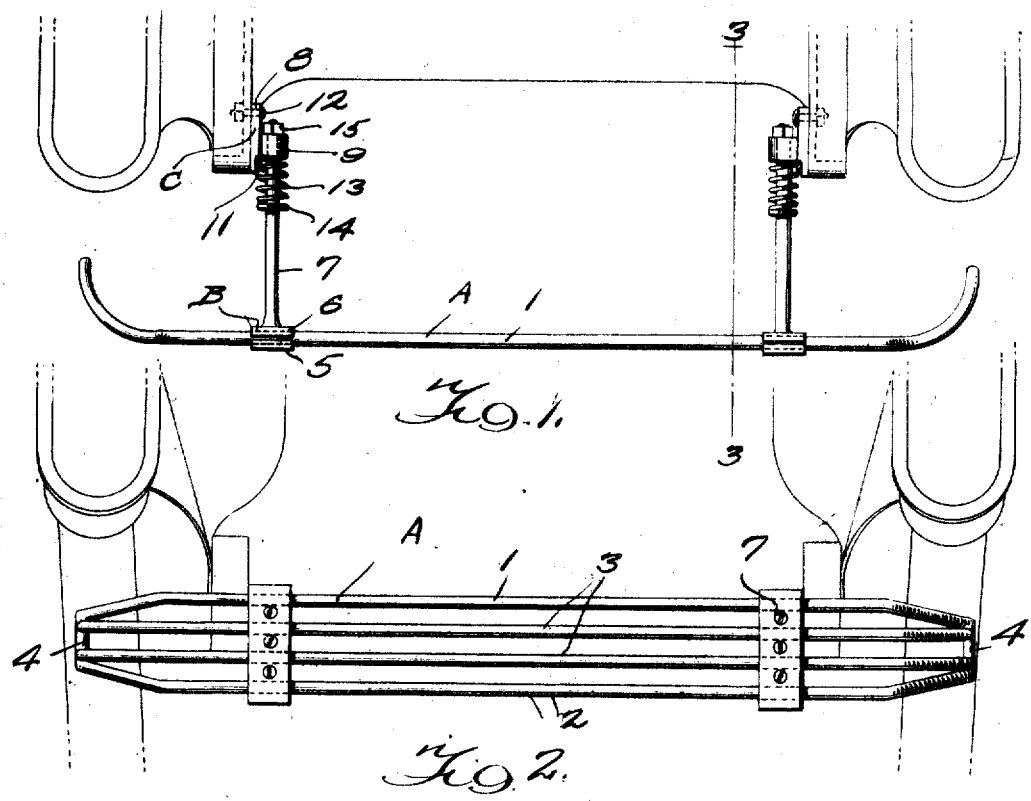
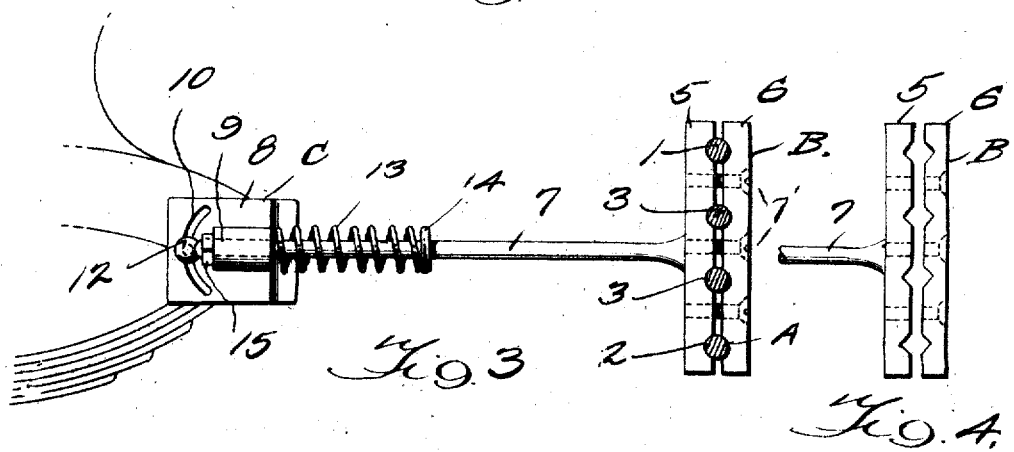
Inventor
DAVID LONEY,
By Richard B. Owen.
Attorney
WITNESS Patented June 10, 1924.

1,496,814

UNITED STATES PATENT OFFICE.

DAVID LONEY, OF KENMORE, OHIO.

VEHICLE BUMPER.

Application filed October 4, 1923. Serial No. 666,628.

*To all whom it may concern:*

Be it known that I, DAVID LONEY, citizen of the United States, residing at Kenmore, in the county of Summit and State of Ohio, have invented certain new and useful Improvements in Vehicle Bumpers, of which the following is a specification.

The present invention relates to a vehicle bumper designed particularly for use upon automobiles and has for its principal object to provide a structure which is resiliently mounted so that when the engaging member on the bumper comes into contact with any obstacle the jar will be compensated by the spring members.

Another object of the invention is to provide an engaging member of durable construction which will be light and not unnecessarily cumbersome.

A still further object of the invention is to provide means for mounting the bumper whereby it may be raised or lowered as desired.

Another object of the invention is to provide a bumper of this nature possessed of a simple and efficient construction, one which is reliable, inexpensive to manufacture and well adapted for the purpose for which it is intended.

With the above and numerous other objects in view which will appear as the description progresses, the invention resides in certain novel features of construction and in the combination and arrangement of parts as will be hereinafter more fully described and claimed.

In the drawing:

Figure 1 is a top plan view of the bumper embodying my invention;

Figure 2 is a front elevation thereof; and

Figure 3 is a section taken substantially on the line 3—3 of Figure 1; and

Figure 4 is an end elevation of one of the clamp members.

Referring to the drawing in detail it will be seen that the engaging member of the bumper consists of a plurality of bars. The top and bottom bars are indicated at 1 and 2 while the intermediate bars are indicated by the numeral 3. The end bars are indicated by the numeral 4. The major portions of the bars 1, 2 and 3 are disposed in parallelism with each other and are slightly spaced from each other. The ends of these bars are curved as is indicated in Figure 1 so as to extend rearwardly toward the automobile. The ends of the bars 1 and 2 converge toward each other and are connected to the ends of the end bars 4 as are also the ends of the bars 3. It is preferable to construct the bars 1, 2 and 4 in one piece or integral while the ends of the bars 3 are secured to the bars 4 by means of welding or the like. It will, therefore, be seen that this engaging member is in the form of a frame which I indicate generally by the letter A. The horizontal bars 1, 2 and 3 of the frame A are mounted in clamps B, two in number. Each clamp consists of a plate 5 which I designate as the fixed plate and a removable plate 6. These plates are provided with grooves for receiving the bars 1, 2 and 3. The plate 6 is engaged with the plate 5 by means of screws 7 the heads of which are countersunk or by any other suitable fastening means. The plates 5 are formed integral with or attached to rods 7 which preferably extend at right angles from the rear faces of the plates 5. Brackets C are provided for attaching these rods 7 to the automobile. Each bracket C includes a body plate 8 having a sleeve 9 mounted thereon. The body plate 8 is provided with an arcuate slot 10. The forward ends of the body plates are secured to the automobile by the spring bolts 11, and bolts 12 pass through the arcuate slots 10 whereby it will be seen that the body plates may be placed in engagement with the automobile at various angles. The rods 7 pass through the sleeves 9 of the bracket and springs 13 are disposed about these rods so as to be positioned between the sleeves and stop members 14 on the rods. Nuts 15 are on the ends of the rods and thus the spring 13 may be tensioned as desired. By loosening the bolts 12 and changing the angles of the brackets C it will be seen that the engaging member may be moved vertically so as to change the elevation thereof. It will be noted that when the frame A engages any article the shock caused by this engagement will be compensated by the springs 13. The bumper is more durable than the ordinary bumper and will not be such a great strain upon the automobile when being brought to a sudden stop because of its engagement with an obstacle.

Although I have described my invention with a certain degree of particularity, it is to be understood that numerous changes in the details of construction and in the combination and arrangement of parts may be resorted to without departing from the spirit of the invention or sacrificing any of its advantages.

What is claimed is:

A bumper of the class described including an engaging member formed from a top bar, a bottom bar extended substantially parallel therewith, and a pair of end bars formed integral with the ends of the top and bottom bars, the end portions of the top and bottom bars converging toward the end bars, and a pair of intermediate bars disposed between the top and bottom bars in parallelism therewith and fixed to the end bars, said bars forming a frame the ends of whch are curved out of alinement with the major portion thereof.

In testimony whereof I affix my signature in presence of two witnesses.

DAVID LONEY.

Witnesses:
B. S. CLARK,
GEO. M. BELCHAMBER.